(12) United States Patent
Chambers et al.

(10) Patent No.: US 9,714,640 B2
(45) Date of Patent: Jul. 25, 2017

(54) WIND TURBINE APPARATUS

(71) Applicants: Justin R. Chambers, Glen Dale, WV (US); James E. Smith, Bruceton Mills, WV (US); Chad C. Panther, Friendsville, MD (US); Andrew D. Lowery, Cumberland, MD (US)

(72) Inventors: Justin R. Chambers, Glen Dale, WV (US); James E. Smith, Bruceton Mills, WV (US); Chad C. Panther, Friendsville, MD (US); Andrew D. Lowery, Cumberland, MD (US)

(73) Assignee: WindPax LLC, Bruceton Mills, WV (US)

(*) Notice: Subject to any disclaimer, the term of this patent is extended or adjusted under 35 U.S.C. 154(b) by 493 days.

(21) Appl. No.: 14/259,767

(22) Filed: Apr. 23, 2014

(65) Prior Publication Data

US 2014/0321989 A1 Oct. 30, 2014

Related U.S. Application Data

(60) Provisional application No. 61/817,507, filed on Apr. 30, 2013.

(51) Int. Cl.
*F03D 1/06* (2006.01)
*F03D 3/06* (2006.01)

(52) U.S. Cl.
CPC .......... *F03D 1/0633* (2013.01); *F03D 3/061* (2013.01); *F03D 3/062* (2013.01); *F03D 3/064* (2013.01); *F03D 3/065* (2013.01); *Y02E 10/721* (2013.01); *Y02E 10/74* (2013.01)

(58) Field of Classification Search
CPC .......... F03D 13/20; F03D 3/064; F03D 3/065; F05B 2240/9151
USPC ..................................... 415/4.5, 4.4
See application file for complete search history.

(56) References Cited

U.S. PATENT DOCUMENTS

| | | | | |
|---|---|---|---|---|
| 7,241,105 B1 * | 7/2007 | Vanderhye | ............. | B63H 13/00 415/4.2 |
| 8,882,441 B2 * | 11/2014 | Harrison | ................... | E03B 3/03 415/4.2 |
| 2004/0105754 A1 * | 6/2004 | Takahashi | ................. | F03D 3/00 415/4.4 |
| 2004/0120820 A1 * | 6/2004 | Dery | ....................... | F03D 3/061 416/197 A |
| 2010/0233919 A1 | 9/2010 | Ersoy | | |
| 2013/0183164 A1 * | 7/2013 | Silvert | .................... | F03D 3/062 416/244 R |
| 2013/0264992 A1 | 10/2013 | Geris et al. | | |
| 2014/0023500 A1 * | 1/2014 | Rubio | .................... | F03D 3/005 416/24 |

* cited by examiner

*Primary Examiner* — R. K. Arundale

(57) ABSTRACT

A wind turbine shaft includes tubes that are centered on a longitudinal axis, coupled to rotate together about the axis, and movable telescopically along the axis between a retracted condition and an extended condition. A mounting structure is configured to mount wind turbine vanes on the tubular structure when the tubes are in the extended condition. A generator has a pair of parts including a rotor and a stator, and is configured for coupling with the tubular structure for one of the parts to rotate about the axis with the tubular structure while the other part is stationary.

27 Claims, 8 Drawing Sheets

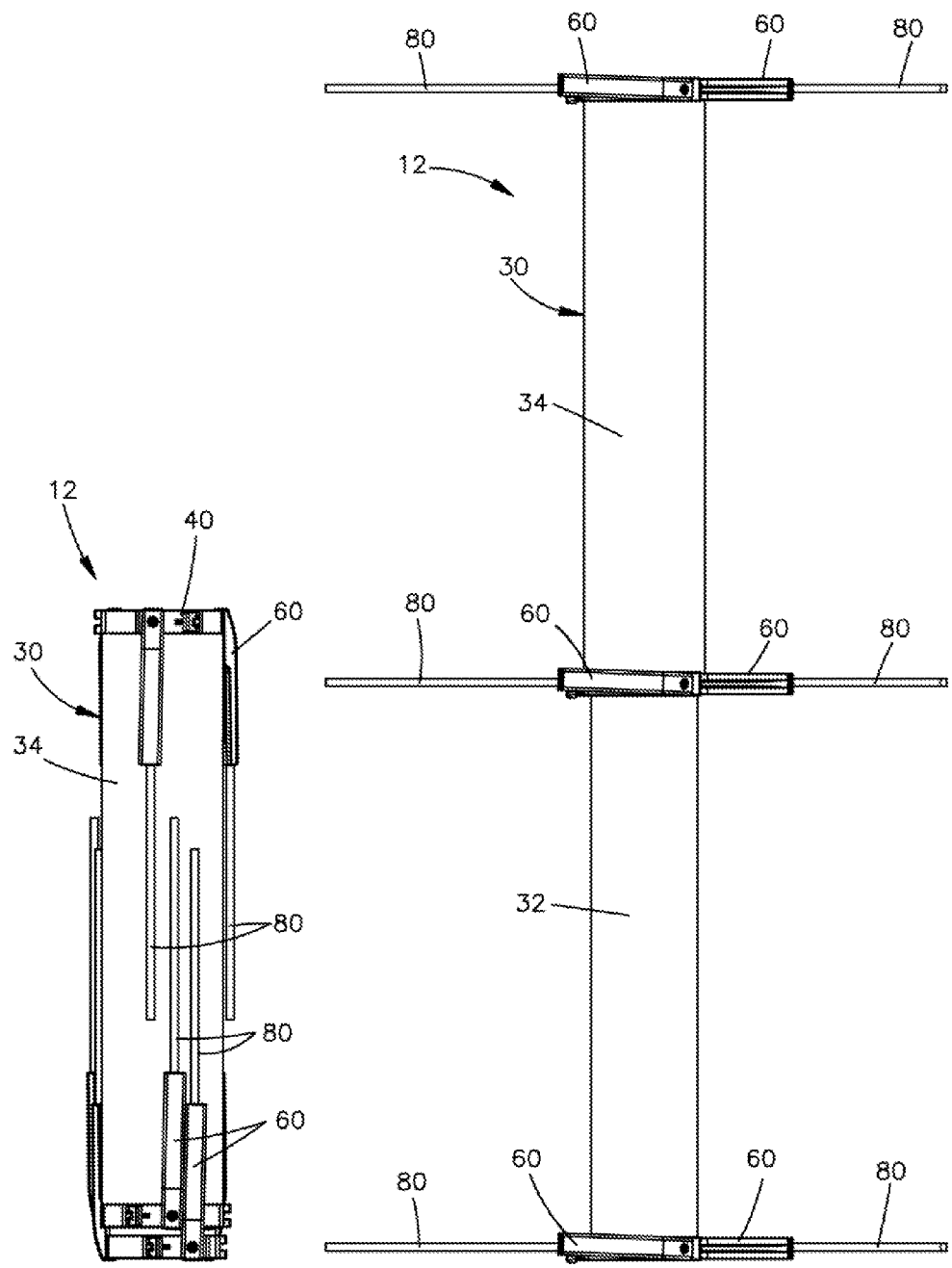

WIND TURBINE APPARATUS

RELATED APPLICATIONS

This application claims the benefit of priority of provisional U.S. patent application 61/817,507, filed Apr. 30, 2013, which is incorporated by reference.

TECHNICAL FIELD

This technology relates to wind turbines for generating electricity.

BACKGROUND

Wind turbines are typically constructed to generate a maximum amount of electricity from the wind available at the site where the turbines are installed. This can be accomplished by constructing turbines as enormous towering structures, and/or by interconnecting an array of turbines across a large distance. Such permanent installations can generate electricity for distribution on a grand scale. However, the need to employ wind power for generating electricity on a smaller scale, and on a temporary basis, may arise at remote locations where a permanent source of electricity is not accessible.

SUMMARY

A wind turbine structure includes tubes that are centered on a longitudinal axis. The tubes are coupled to rotate together about the axis, and are movable telescopically along the axis between retracted and extended positions. A mounting structure is configured to mount wind turbine vanes on the tubular structure when the tubes are in the extended positions. A generator has a pair of parts including a rotor and a stator, and is configured for coupling with the tubular structure for one of the parts to rotate about the axis with the tubular structure while the other part is stationary.

The generator may be configured for installation within the tubular structure. Preferably, the generator has a housing configured for installation within a tube in a fit that blocks rotation of the housing about the axis relative to the tube, and that also blocks movement of the housing along the axis relative to the tube.

In a preferred embodiment, the one part of the generator is the stator and the other part is the rotor. A support structure supports the tubular structure in an operative position. A bearing supports the stator for rotation about the axis relative to the support structure. The axis is preferably vertical when the tubular structure is in the operative position.

In the preferred embodiment, the tubes have a full range of telescopic movement, and the support structure and the bearing are configured to remain within the tubular structure throughout the full range of telescopic movement.

Summarized differently, an apparatus comprises a tubular structure, a mounting structure, and a generator. The tubular structure includes first and second tubes that are centered on a longitudinal axis, rotatable about the axis, and movable telescopically along the axis. The mounting structure is configured to mount wind turbine vanes on the tubular structure. The generator has a housing configured for installation within the tubular structure to rotate with the first tube, and to move axially with the first tube relative to the second tube.

In another embodiment, a shaft has a longitudinal axis, a wind turbine vane has a front side and a rear side, and a bearing supports the vane for rotation about the axis. The vane is spaced radially from the shaft across a gap through which air can flow transversely past the shaft from the front side of the vane to the rear side when the vane rotates about the axis. A flow control means directs air to flow through the gap in a predetermined direction when the vane rotates about the axis.

BRIEF DESCRIPTION OF THE DRAWINGS

FIG. 11 is a view similar to FIG. 2, showing additional parts of the device.
FIG. 12 is a view similar to FIG. 11, showing parts in different positions.

DETAILED DESCRIPTION

Figure 1:
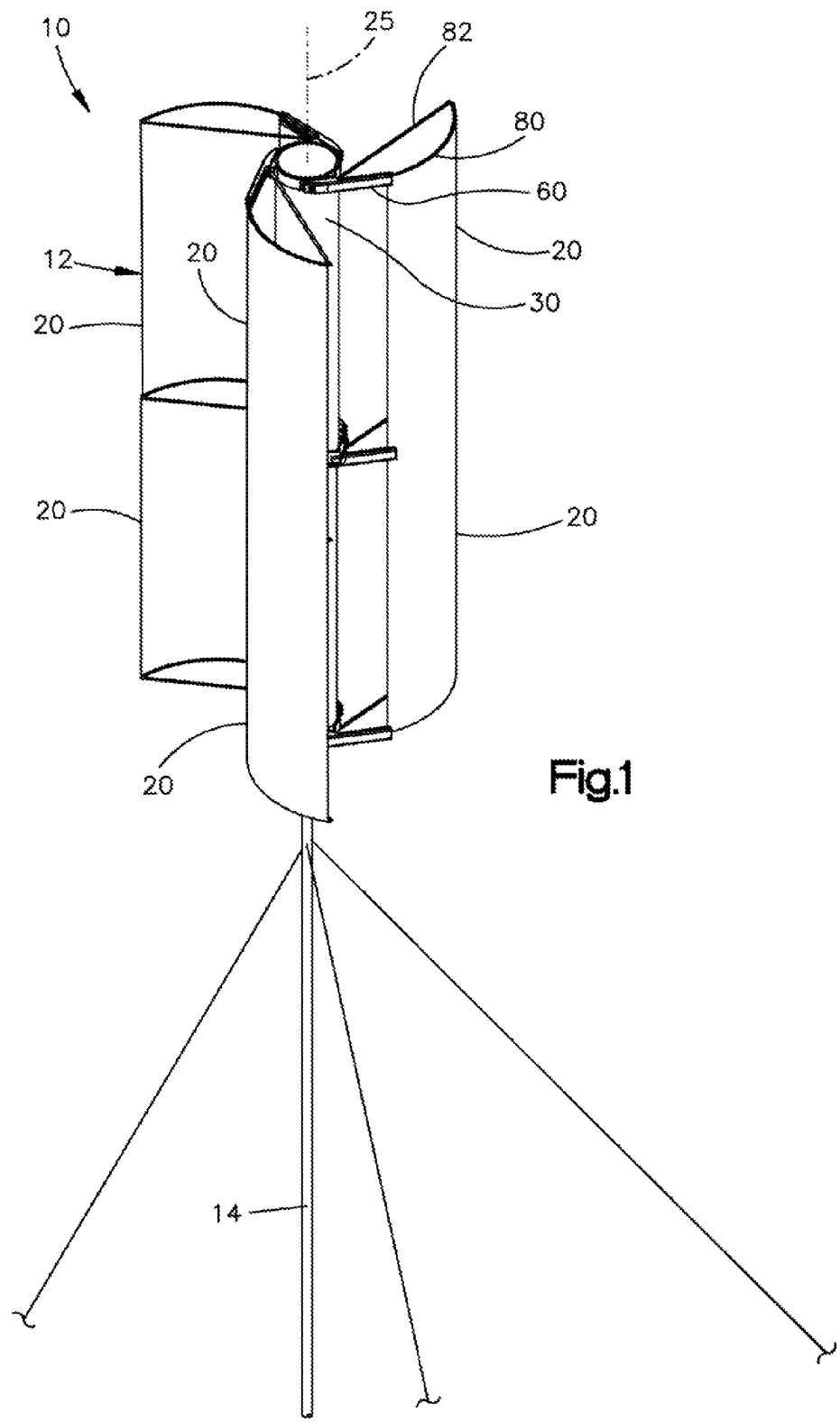
FIG. 1 is a perspective view of a device including a wind turbine in an operative position.

The structures shown in the drawings have parts that are examples of the elements recited in the claims. The illustrated structures thus include examples of how a person of ordinary skill in the art can make and use the claimed invention. They are described here to meet the enablement and best mode requirements of the patent statute without imposing limitations that are not recited in the claims. One or more parts of each embodiment may be used in combination with one or more parts of another embodiment.

The apparatus shown in FIG. 1 is a collapsible wind powered energy generation device 10. The device 10 includes a wind turbine 12 on a pole 14 that is tethered to the ground in a vertical position. The turbine 12 has vanes 20 that are driven by the wind to rotate about the axis 25 of the pole 14, and contains a generator that is driven by the rotating vanes 20.

The turbine 12 in the illustrated example may be referred to as a vertical axis wind turbine, or alternatively as transverse axis wind turbine, as the vanes 20 are arranged to rotate about an axis 25 that is vertical or otherwise transverse to the wind direction. The vanes 20 are mounted on a rotatable shaft 30, and are elongated in directions reaching lengthwise of the shaft 30.

Figure 2:
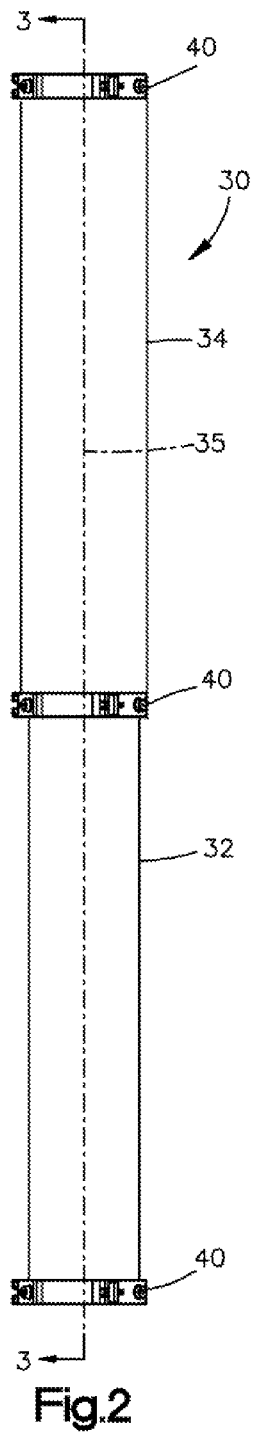
FIG. 2 is a side view of parts of the device of FIG. 1.
Figure 3:
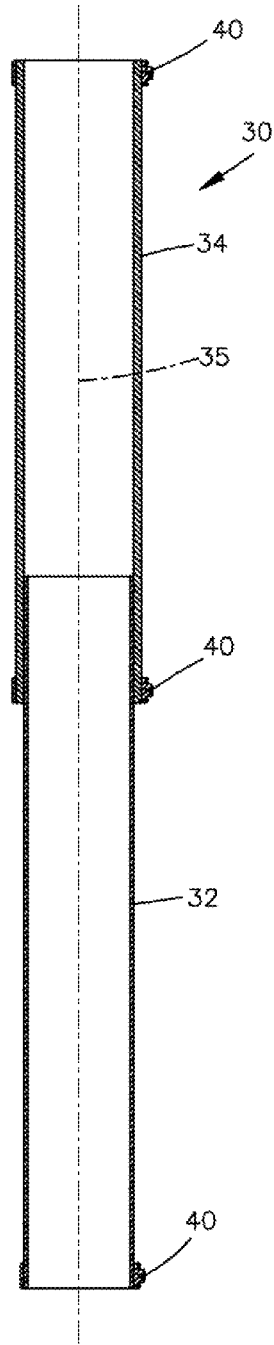
FIG. 3 is a sectional view taken on line 3-3 of FIG. 2.
Figure 4:
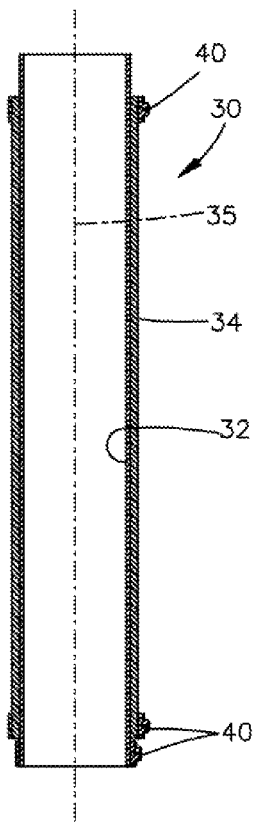
FIG. 4 is view similar to FIG. 3, showing parts in different positions.

As shown separately in FIGS. 2 and 3, the shaft 30 in the illustrated example is a collapsible tubular structure including first and second tubes 32 and 34 that are centered on a longitudinal axis 35. The first tube 32 is coupled with the second tube 34 to rotate about the axis 35 with the second tube 34, and also to move telescopically along the axis 35 relative to the second tube 34. In the illustrated embodiment, which represents a working prototype, this coupling is established by a press fit of the first tube 32 within the second tube 34. The press fit is tight enough to block rotation of the first tube 32 relative to the second tube 34 under the force of wind acting on the turbine 12 under ordinary operating conditions, but is loose enough to permit a user to slide the first tube 32 back and forth in axially opposite directions within the second tube 34 with a manually applied force. The tubes 32 and 34 have a range of telescopic movement between fully extended positions, as shown in FIG. 3, and fully retracted positions, as shown in FIG. 4.

A vane mounting structure, including brackets 40, is provided for mounting the vanes 20 on the shaft 30. As shown in FIGS. 2 and 3, the brackets 40 in the illustrated example are attached to the shaft 30, and are equally spaced-apart along the length of the shaft 30 in the fully extended condition. Specifically, a top bracket 40 is located at the upper end of the second tube 34; a middle bracket 40 is located at the lower end of the second tube 34; and a bottom bracket 40 is located at the lower end of the first tube 32.

Figure 5:
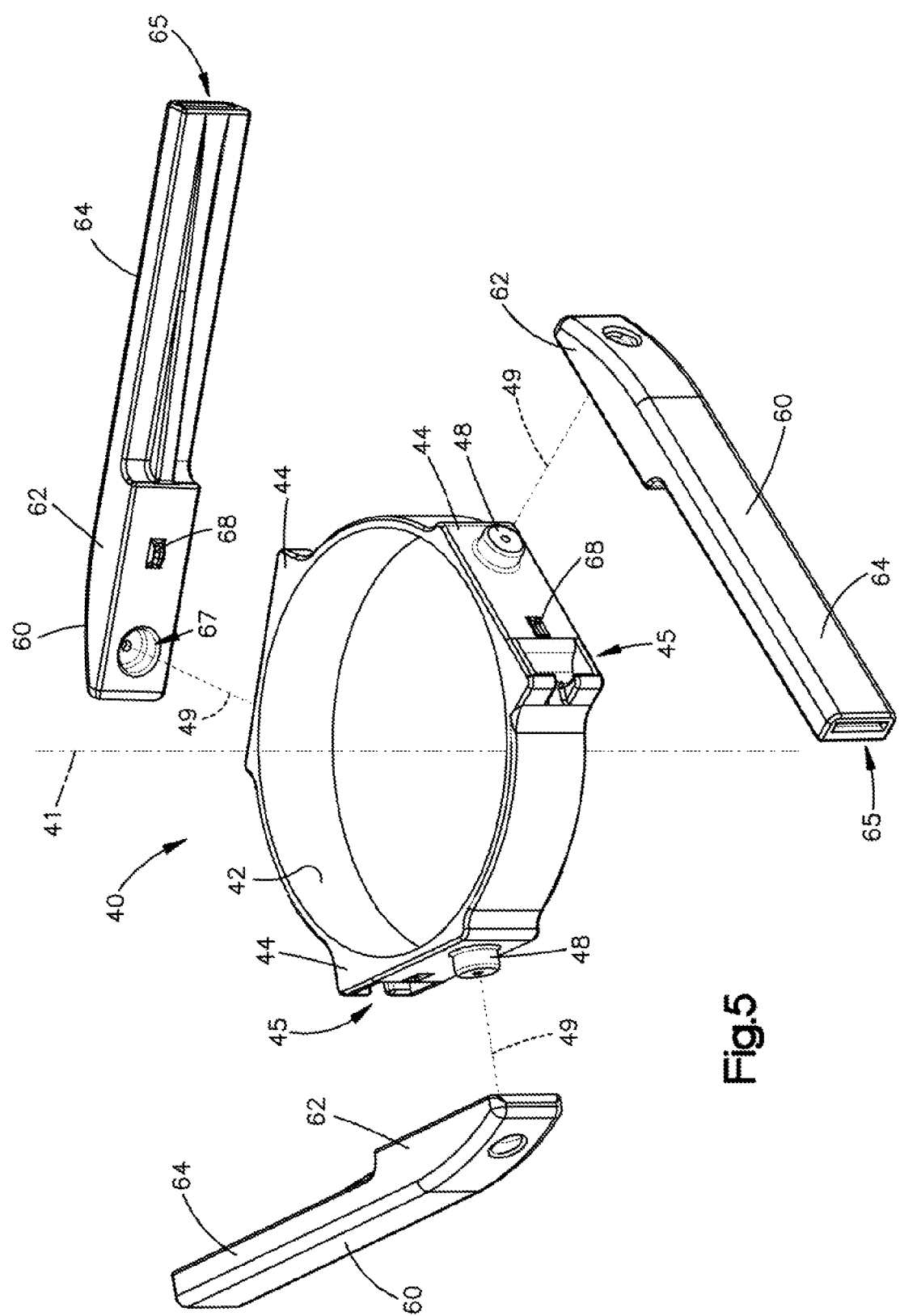
FIG. 5 is an exploded perspective view of parts of the device of FIG. 1.

Each bracket 40 is a ring-shaped part with a central axis 41, as shown for example in FIG. 5. An annular inner surface 42 of the bracket 40 is sized to fit closely over the tube 32 or 34 upon which it is mounted. A press fit and/or an adhesive bond may secure the bracket 40 to the corresponding tube 32 or 34. The bracket 40 also has attachment bases 44 that reach along its outer periphery. The illustrated example has three attachment bases 44 at locations equally spaced apart about the axis 41. Each of these attachment bases 44 has a retainer notch 45 at one end, and has a small hub 48 at the other end. The hubs 48 are centered on transverse axes 49 perpendicular to the axis 41.

The vane mounting structure further includes attachment arms 60 at the attachment bases 44. As shown in the exploded view of FIG. 5, each attachment arm 60 has inner and outer end portions 62 and 64. The outer end portions 64 are configured as handles for manual operation. Each outer end portion 64 has a narrow, slot-shaped bore 65 reaching inward from its terminal end. The inner end portions 62 have circular bores 67 for mounting the arms 60 on the hubs 48.

Figure 6:
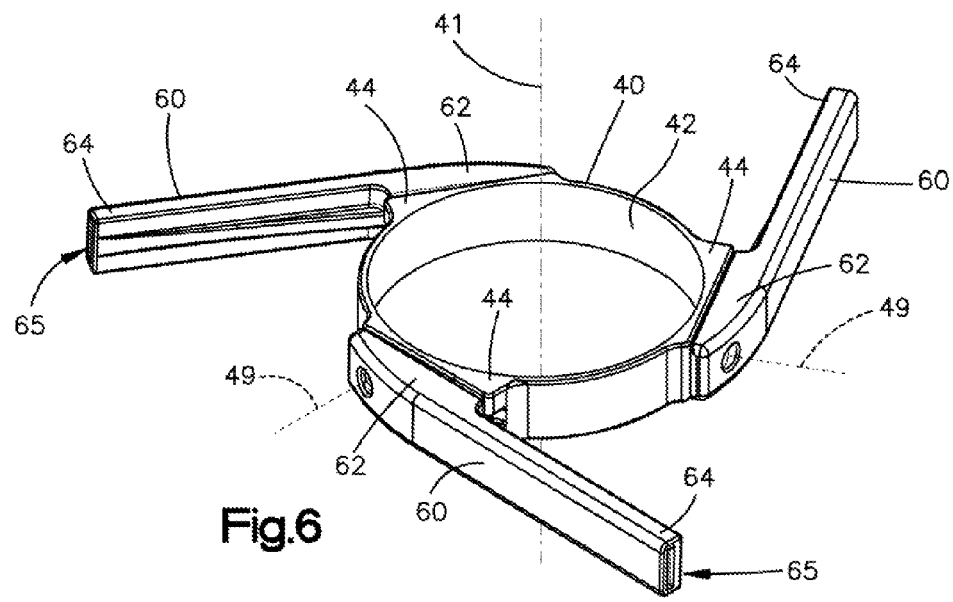
FIG. 6 is a view similar to FIG. 5, showing parts in an assembled relationship.
Figure 7:
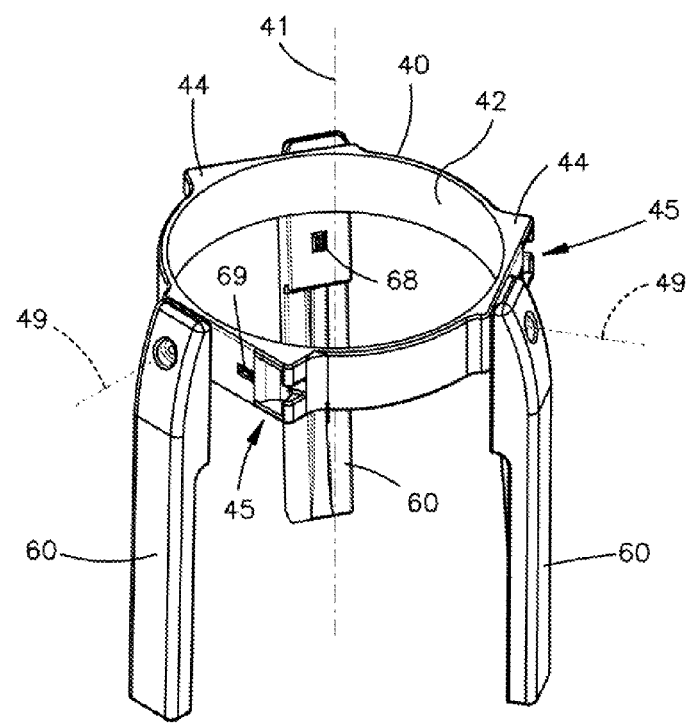
FIG. 7 is a view similar to FIG. 6, showing parts in different positions.

The arms 60 are movable on the hubs 48 pivotally about the transverse axes 49 between extended positions perpendicular to the central axis 41, as shown in FIG. 6, and retracted positions parallel to the central axis 41, as shown in FIG. 7. Detents 68 on the arms 60 interact with recesses 69 on the bases 44 to hold the arms 60 releasably in the extended positions. As further shown in FIG. 6, when an arm 60 is in the extended position, the inner end portion 62 of the arm 60 reaches over the retainer notch 45 in the adjacent base 44.

Figure 8:
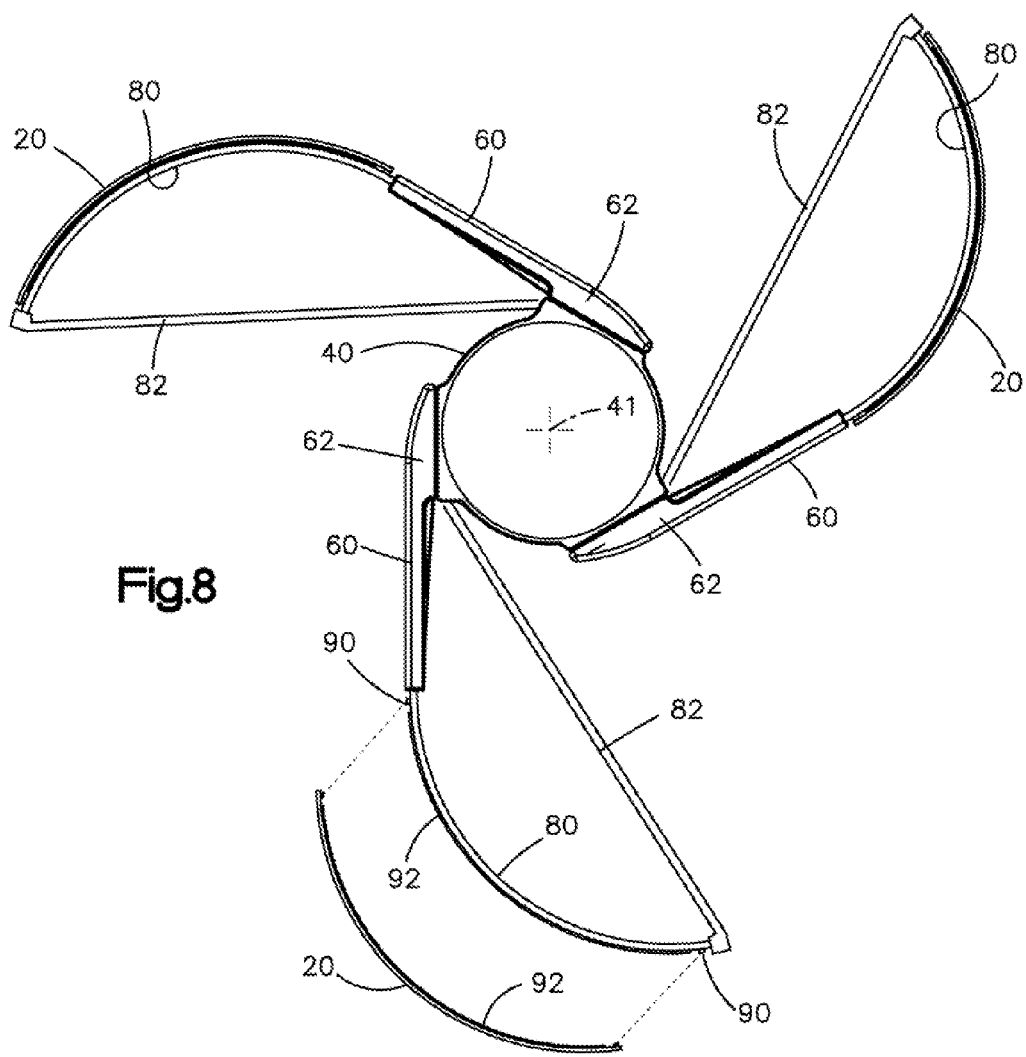
FIG. 8 is an end view of parts of the device of FIG. 1.
Figure 9:
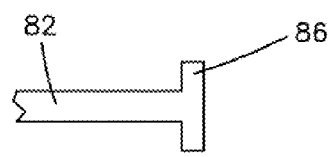
FIG. 9 is a partial view of a part shown in FIG. 8.

Other parts of the vane mounting structure include bows 80 and tension rods 82, as shown in FIG. 8. The bows 80 are flexible straps with inner ends installed and fixed within the bores 65 in the arms 60. The tension rods 82 have T-shaped inner ends 86 (FIG. 9) that fit into the retainer notches 45 (FIG. 5) on the attachment bases 44. When an operator places the inner end 86 of a tension rod 82 in a retainer notch 45, and then pivots the adjacent arm 60 to the extended position, the inner end portion 62 of the arm 60 moves over the notch 45 to lock the tension rod 82 to the bracket 40. The operator can then attach the bow 80 and tension rod 82 together at their outer ends, as shown in FIG. 8, with the tension rod 82 holding the bow 80 in an arc. The vanes 20 may be attached directly to the bows 80 with snaps 90 and hook-and-loop fastener strips 92, as shown for example in FIG. 8.

Additional parts of the device 10 include a generator 140 and a support structure 142. As shown schematically in FIG. 10, this example of a generator 140 has a cylindrical housing 150 and a circular base 152 centered on an axis 153. A stator 154 is fixed to the housing 150, and a rotor 156 is fixed to the base 152. Bearings 158 support the housing 150 for rotation about the axis 153 relative to the base 152.

The support structure 142 in the illustrated example includes a circular support plate 160 and a tubular support bar 162 centered on an axis 163. Fasteners 170 attach the support plate 160 coaxially to the base 152 of the generator 140 to suspend the support structure 142 from the generator 140, and also to block rotation of the base 152 relative to the support structure 142.

Figure 10:
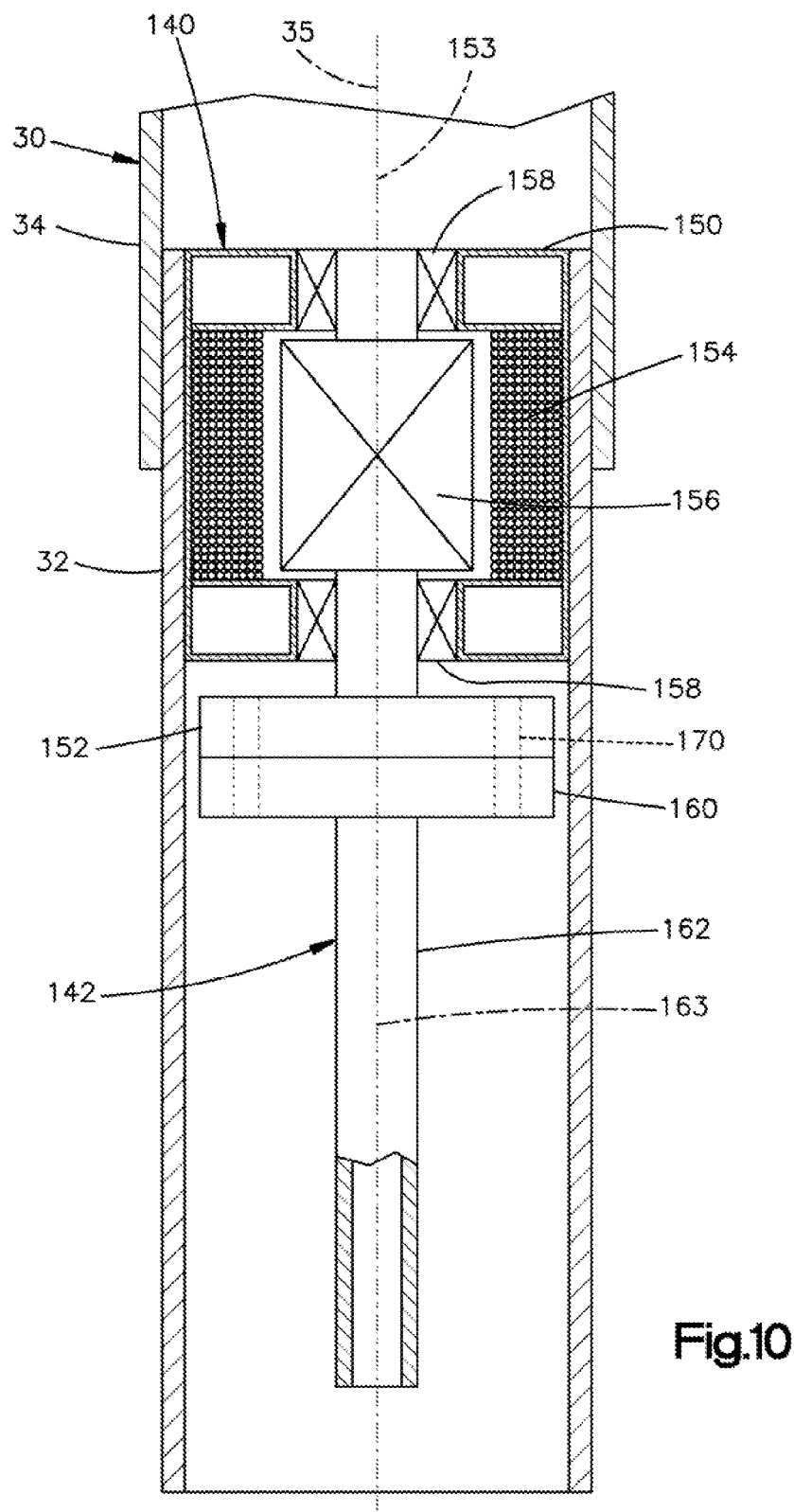
FIG. 10 is a schematic view, partly in section, of parts of the device of FIG. 1.

As further shown in FIG. 10, the interconnected generator 140 and support structure 142 are received coaxially within the shaft 30. In the illustrated embodiment, the generator housing 150 is received within the first tube 32 in a press fit that is tight enough to block rotation of the housing 150 about the axis 35 relative to the first tube 32 under ordinary operating conditions, and also to block movement of the housing 150 along the axis 35 relative to the first tube 32 under ordinary operating conditions. In this manner the housing 150 and the stator 154 are coupled with the shaft 30 to rotate about the axis 35 with the shaft 30. Those parts are all rotatable about the axis 35 relative to the rotor 156, the generator base 152, and the support structure 142.

The wind turbine 12 may be stored in a collapsed condition with the shaft 30 and the arms 60 retracted, as shown in FIG. 11. The arms 60 and bows 80 at the top bracket 40 are preferably retracted downward along the length of the shaft 30, with the arms 60 and bows 80 at the middle and bottom brackets 40 retracted upward, for the most compact arrangement. The press fit between the tubes 32 and 34 can be overcome manually so that the first tube 32 may be rotated relative to the second tubes 34 as needed to provide clearance for the arms 60 and bows 80 at the bottom to reach upward beside the adjacent arms 60 and bows 80 at the middle.

An operator can manually shift the turbine 12 to a deployed condition by moving the tubes 32 and 34 and the arms 60 to their extended positions as shown in FIG. 12, and can then mount the vanes 20 on the bows 80 as shown in FIG. 1. In the illustrated embodiment, three vanes 20 are mounted to reach lengthwise between the bows 80 at the bottom and middle brackets 40, and another three vanes 20 are mounted to reach lengthwise between the bows 80 at the middle and top brackets 40. In this arrangement the bows 80 and the other parts of the mounting structure connect each of the six vanes 20 directly to one or both of the tubes 32 and 34 for the vanes 20 to rotate together about the axis 35 with the shaft 30.

An open lower end of the support bar 160 (FIG. 10) is configured to fit coaxially over the upper end of the pole 14 (FIG. 1) in a fit that blocks rotation of the bar 160 relative to the pole 14. Accordingly, when the turbine 12 is mounted on the pole 14 and is rotated by the wind, the vanes 20 and the shaft 30 rotate about the axis 25 together, which drives the stator 154 to rotate about the rotor 156 and thereby to generate electricity. The electrical output of the generator 140 may be fed to rechargeable batteries or any other appropriate electrical load.

The turbine 12 may be removed from the pole 14 and returned to the collapsed condition by a reversal of the deployment steps. Further regarding storage of the turbine 12, the support structure 142 is preferably configured for the lower end of the support bar 162, which does not move relative to the first tube 32 in ordinary use, to be spaced axially inward from the lower end of the first tube 32. This arrangement retains the support structure 142 fully within the shaft 30 throughout the entire range of telescopic movement of the tubes 32 and 34 between their retracted and extended positions. Additionally, each of the arms 60 is preferably shorter than the retracted shaft 30, as shown in FIG. 11. These features help to provide a compact arrangement of parts in the collapsed turbine 12.

Figure 13:
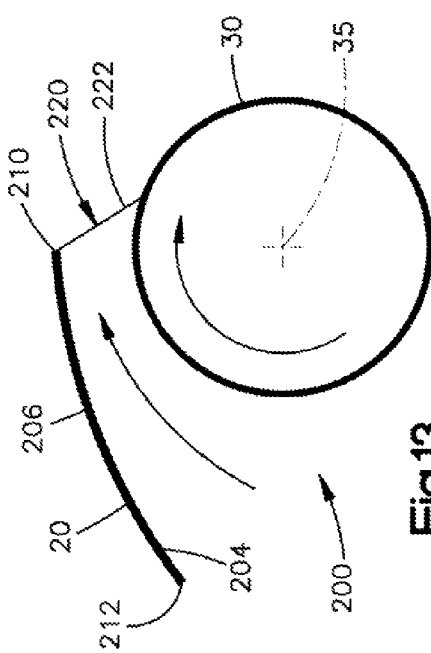
FIG. 13 is a schematic view of parts of another device including a wind turbine.

In the embodiment shown partially in FIG. 13, a wind turbine 200 may include parts that are the same or substantially the same as corresponding parts of the turbine 12 described above. Such parts are indicated by the use of the same reference numbers, including a shaft 30 having a longitudinal central axis of rotation 35, and vanes 20 supported for rotation about the axis 35 with the shaft 30. Each vane 20, one of which is shown in FIG. 13, has a concave side 204 and a convex side 206. These may be referred to as the trailing side 204 and the advancing side 206 when rotating about the axis 35 in a clockwise direction as viewed in FIG. 13. Each vane 20 also has radially inner and outer edges 210 and 212 reaching longitudinally in directions generally parallel to the axis 35. The inner edge 210 is spaced from the shaft 30 across a gap through which air can flow transversely past the shaft 30 from the trailing side 204 of the vane 20 to the advancing side 206.

As further shown schematically in FIG. 13, the turbine 200 is equipped with means for directing air to flow through the gap in a predetermined direction, which in this embodiment comprises a reed valve 220. The valve 220 includes a blade 222 that is joined to the radially inner edge 210 of the vane 20. When the valve 220 is in the closed condition shown in FIG. 13, the blade 222 reaches across the gap from the vane 20 to the shaft 30.

Figure 14:
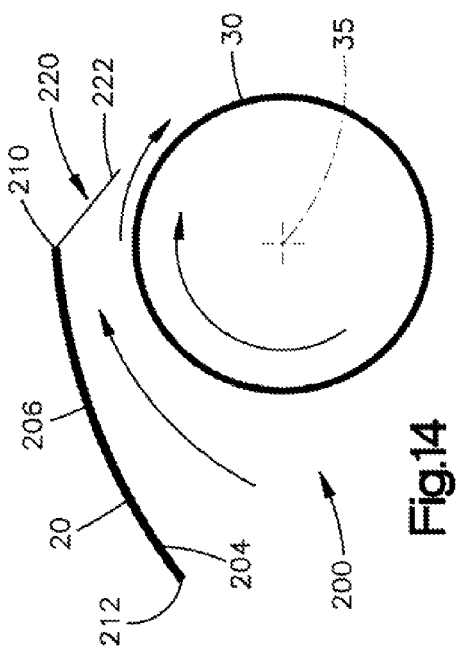
FIG. 14 is a view similar to FIG. 13, showing a part in a different position.

The valve 220 is shiftable from the closed condition of FIG. 13 to an open position, as shown for example in FIG. 14, under the influence of a predetermined threshold amount of air pressure, and is further shiftable throughout a range of open conditions under increased amounts of air pressure. In this manner the valve 220 and the rotating shaft 30 cooperate to induce the Coanda effect to direct air to flow in an arcuate path reaching circumferentially around the shaft 30.

Figure 15:
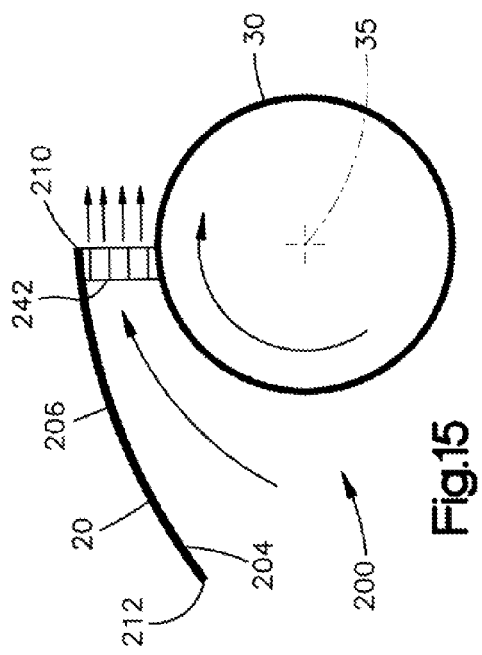
FIG. 15 is a view of yet another device including a wind turbine.

In another embodiment, the wind turbine 200 may be similarly equipped with a flow straightener 242, as shown schematically in FIG. 15, for directing air to flow through the gap in a predetermined linear direction transverse to the shaft 30. The flow straightener 242 preferably defines multiple air flow passages that reach through the gap in the predetermined direction separately from each other.

This written description sets for the best mode of carrying out the invention, and describes the invention so as to enable a person skilled in the art to make and use the invention, by presenting examples of elements recited in the claims. The patentable scope of the invention is defined by the claims, and may include other examples that occur to those skilled in the art. Such other examples, which may be available either before or after the application filing date, are intended to be within the scope of the claims if they have structural elements that do not differ from the literal language of the claims, or if they have equivalent structural elements with insubstantial differences from the literal language of the claims.

What is claimed is:

1. An apparatus comprising:
   a wind turbine vane;
   a tubular structure including tubes that are centered on a longitudinal axis, coupled to rotate together about the axis, and movable telescopically along the axis between retracted positions and extended positions;
   a mounting structure configured to mount the vane on the tubular structure when the tubes are in the extended positions; and
   a generator having a pair of parts including a rotor and a stator, and being configured for coupling with the tubular structure for one of the parts to rotate about the axis with the tubular structure while the other part is stationary.

2. An apparatus as defined in claim 1 wherein the generator is configured for installation within the tubular structure.

3. An apparatus as defined in claim 2 wherein the generator has a housing configured for installation within a tube in a fit that blocks rotation of the housing about the axis relative to the tube, and that also blocks movement of the housing along the axis relative to the tube.

4. An apparatus as defined in claim 1 wherein the one part of the generator is the stator and the other part is the rotor.

5. An apparatus as defined in claim 1 further comprising a support structure configured to support the tubular structure in an operative position, and a bearing configured to support the one part of the generator for rotation about the axis relative to the support structure.

6. An apparatus as defined in claim 5 wherein the axis is vertical when the tubular structure is in the operative position.

7. An apparatus as defined in claim 5 wherein the support structure and the bearing are configured to remain within the tubular structure throughout an entire range of telescopic movement between the retracted position and the extended position.

8. An apparatus as defined in claim 1 wherein the mounting structure is configured to couple the vane to the tubular structure for rotation about the axis with the tubular structure.

9. An apparatus as defined in claim 1 wherein the tubes include first and second tubes, and the mounting structure is configured to attach the vane directly to each of the first and second tubes.

10. An apparatus comprising:
    a wind turbine vane;
    a tubular structure including first and second tubes that are centered on a longitudinal axis, rotatable about the axis, and movable telescopically along the axis;
    a mounting structure configured to mount the vane on the tubular structure; and
    a generator having a housing configured for installation within the tubular structure to rotate with the first tube, and to move axially with the first tube relative to the second tube.

11. An apparatus as defined in claim 10 wherein the first tube is movable telescopically within the second tube.

12. An apparatus as defined in claim 10 further comprising a support structure configured to support the tubular structure in an upright position, and a bearing configured to support the generator housing for rotation about the axis relative to the support structure.

13. An apparatus as defined in claim 12 wherein the axis is vertical when the tubular structure is in the operative position.

14. An apparatus as defined in claim 12 wherein the tubular structure has a lower end, and the support structure has a lower end spaced inward from the lower end of the tubular structure.

15. An apparatus as defined in claim 14 wherein the lower end of the support structure remains spaced inward from the lower end of the tubular structure throughout an entire range of telescopic movement between a retracted position and an extended position between the first and second tubes.

16. An apparatus as defined in claim 10 wherein the mounting structure is configured to couple the vane to the tubular structure for rotation about the axis with the tubular structure.

17. An apparatus as defined in claim 10 wherein the mounting structure is configured to connect the vane directly to each of the first and second tubes.

18. An apparatus comprising:
a wind turbine vane;
a tubular structure including tubes that are centered on a longitudinal axis, rotatable about the axis, and movable telescopically along the axis;
a mounting structure configured to mount the vane on the tubular structure;
a generator configured for installation within the tubular structure;
a support structure configured for installation within the tubular structure and to support the tubular structure in an operative position; and
a bearing configured for installation within the tubular structure to support the tubular structure for rotation about the axis relative to the support structure.

19. An apparatus as defined in claim 18 wherein the axis is vertical when the tubular structure is in the operative position.

20. An apparatus as defined in claim 18 wherein the generator, the support structure and the bearing are configured to remain within the tubular structure throughout an entire range of telescopic movement between a retracted position and an extended position between the tubes.

21. An apparatus as defined in claim 20 wherein the tubular structure has a lower end, and the support structure has a lower end spaced inward from the lower end of the tubular structure.

22. An apparatus as defined in claim 18 wherein the mounting structure is configured to couple the vane to the tubular structure for rotation about the axis with the tubular structure.

23. An apparatus as defined in claim 18 wherein the tubes include first and second tubes, and the mounting structure is configured to attach the vane directly to each of the first and second tubes.

24. An apparatus comprising:
a wind turbine vane;
a tubular structure including first and second tubes that are centered on a longitudinal axis, coupled to rotate together about the axis, and movable telescopically along the axis between retracted positions and extended positions; and
a mounting structure configured to support the vane on the tubular structure for rotation about the axis with the first and second tubes.

25. An apparatus as defined in claim 24 wherein the mounting structure includes attachment arms supported on the tubular structure for movement pivotally about axes transverse to the longitudinal axis.

26. An apparatus as defined in claim 25 wherein the mounting arms are moveable pivotally between extended positions perpendicular to the longitudinal axis and retracted positions parallel to the longitudinal axis.

27. An apparatus as defined in claim 24 where the mounting structure is configured to attach the vane directly to each of the first and second tubes.

* * * * *